No. 821,425. PATENTED MAY 22, 1906.
P. MEEHAN.
GAS CLEANER.
APPLICATION FILED JAN. 20, 1905.
4 SHEETS—SHEET 1.
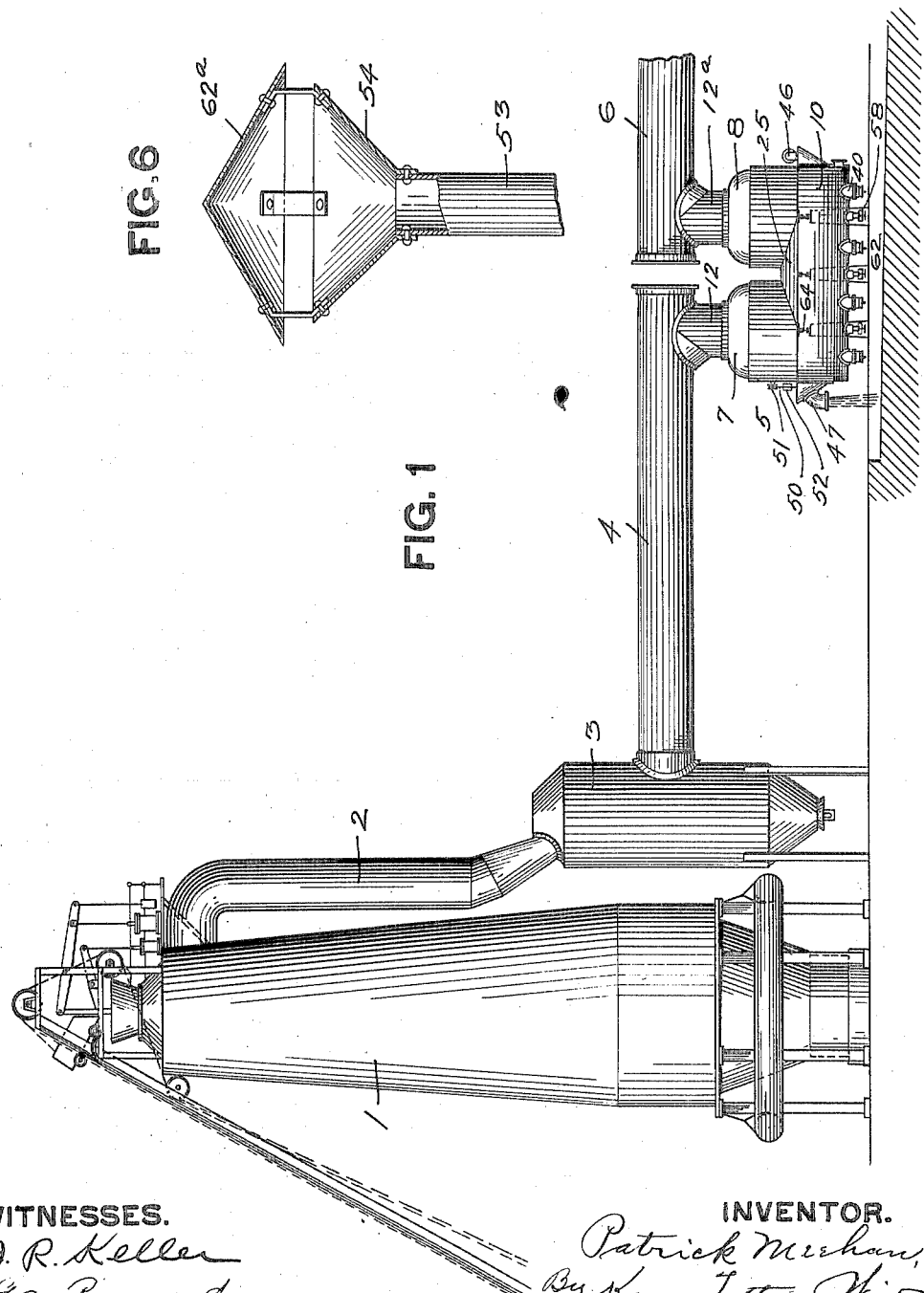
WITNESSES.
J. R. Keller
G. C. Raymond
INVENTOR.
Patrick Meehan,
By Kay, Totten & Winter,
His Attys

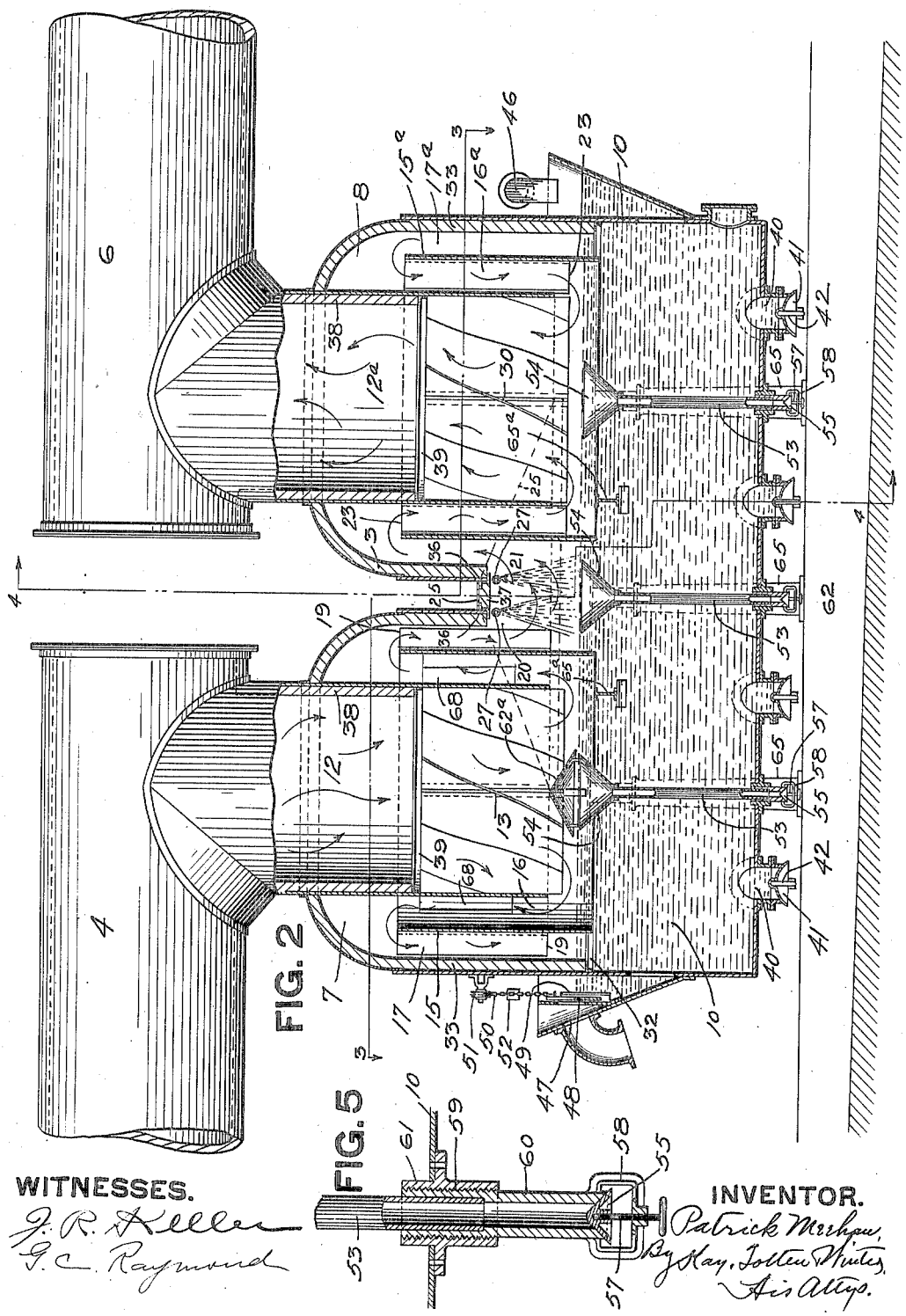

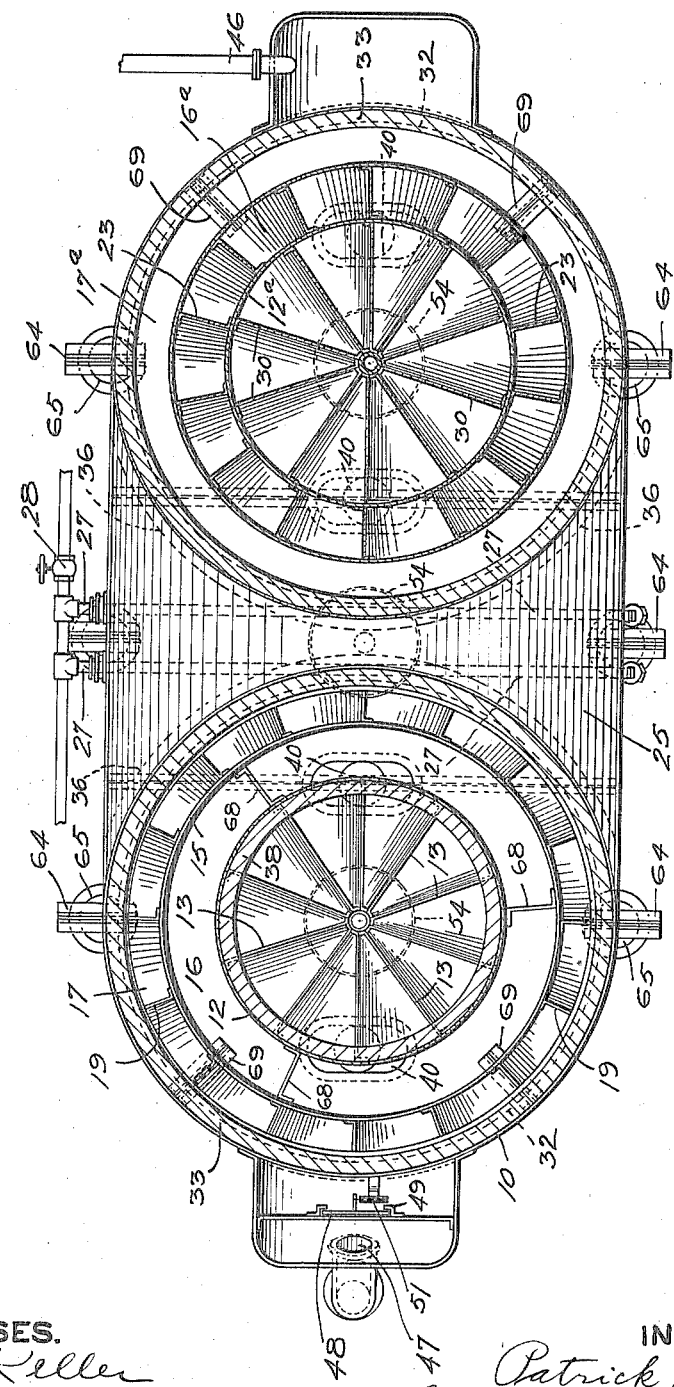

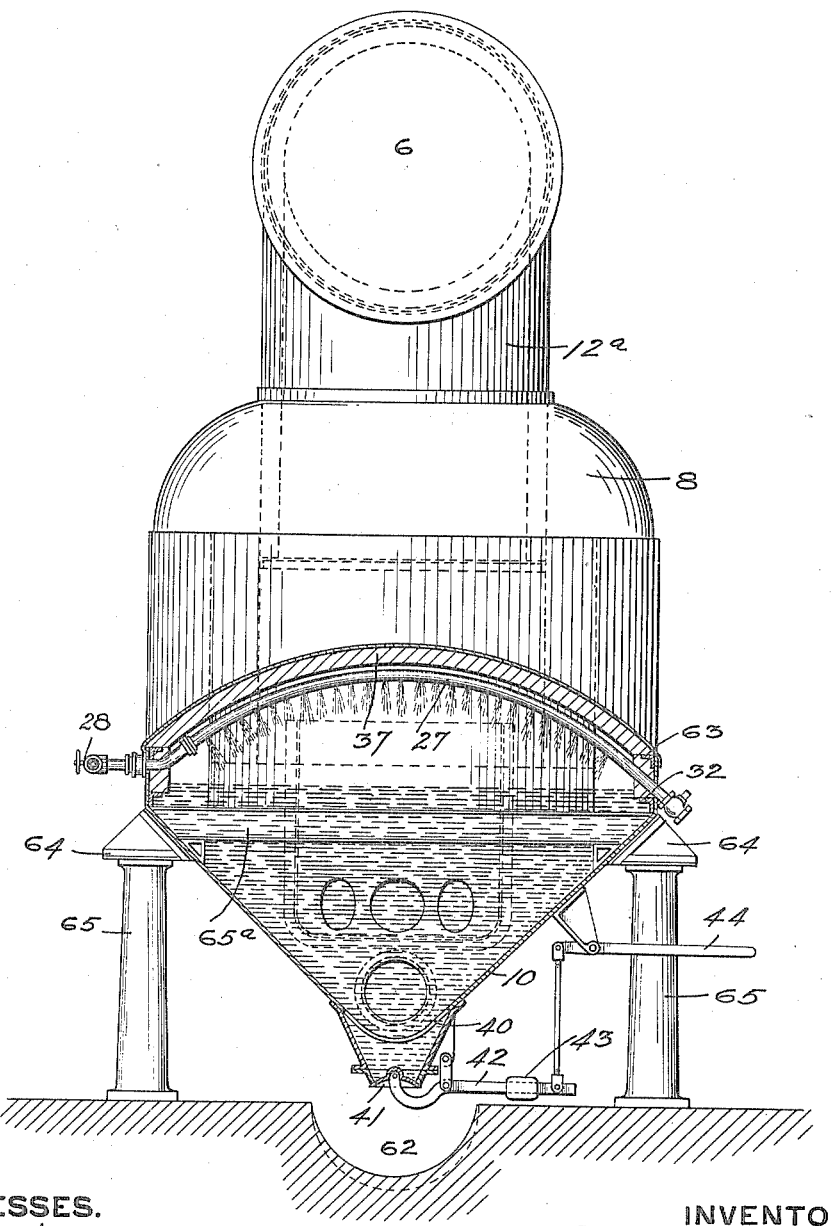

UNITED STATES PATENT OFFICE.

PATRICK MEEHAN, OF LOWELLVILLE, OHIO.

GAS-CLEANER.

No. 821,425.

Specification of Letters Patent.

Patented May 22, 1906.

Application filed January 20, 1905. Serial No. 241,988.

*To all whom it may concern:*

Be it known that I, PATRICK MEEHAN, a resident of Lowellville, in the State of Ohio, have invented a new and useful Improvement in Gas-Cleaners; and I do hereby declare the following to be a full, clear, and exact description thereof.

My invention relates to gas-cleaners, and is more especially designed for cleaning gas generated in blast-furnaces for use in the hot stoves and under the boilers, although it is not limited to these purposes in all of its features, but may be used for cleaning any kind of gas.

The object of my invention is to provide a gas-cleaner, and more especially for blast-furnaces, which will thoroughly clean the gas and without materially reducing the temperature thereof, so that the calorific property of the gas will be higher than that of cold gas.

In modern blast-furnace practice it is the custom to save the gas generated by the furnace, conduct the same through suitable dust-catchers, and then use the cleaned gas in the hot-blast stoves and under the boilers. None of the dust-catchers at present in use will remove all the impurities from the gas, and as a result the gas frequently cannot be used.

My invention is intended to take the gas after coming from the dust-catchers and thoroughly free the same from dust and other impurities, so that the gas can be used in the hot-blast stoves or under the boilers, or for any other purposes, and to do this in such a manner that the temperature of the gas will not be materially reduced.

To this end the invention consists, generally stated, in conducting the gas through a series of water-sealed chambers which are so constructed that the gas will be repeatedly discharged or blown against the surface of baffle-plates in said chambers, thus causing the dust and other impurities therein to be beaten out and slide down into the water and be removed from the gas.

More specifically stated, the invention comprises such an arrangement and construction of the chambers that the gas will be given a whirling motion against the baffle-plates, so as to knock down the dust contained in it, to thoroughly mix the gas and cause all portions thereof to come into contact with the surfaces of the baffle-plates.

The invention also consists in means for removing the accumulated impurities from the surface of the water, so as to keep said surface clean and enable it the better to moisten the dust coming into contact therewith.

The invention also consists in means whereby when necessary the gas can be sprayed with water to wash the same and can then be dried.

The invention also consists in details of construction rendering apparatus of this character simple and cheap to build and easy to clean and keep in repair.

In the accompanying drawings, Figure 1 is a side elevation of a blast-furnace, showing my invention applied thereto. Fig. 2 is a longitudinal vertical section through the gas-cleaner. Fig. 3 is a horizontal section on the line 3 3, Fig. 2. Fig. 4 is a transverse vertical section on the line 4 4, Fig. 2. Fig. 5 is a sectional detail view of the regulating-valve for the drain-pipe, and Fig. 6 is a similar view of the hood therefor.

1 indicates the blast-furnace stack, and 2 the down-comer pipe leading from the top of the furnace to the dust-catcher 3. All of these parts may be of the usual or ordinary construction.

The dust-catcher is provided with an outlet-pipe 4, leading to my gas-cleaner 5, and 6 is a pipe leading from the cleaner to the hot-blast stoves, boiler, or other place of using the cleaned gas.

The gas-cleaner comprises two or more water-sealed chambers arranged in series, with passages for conducting the gas through said chambers in succession. In the drawings two such chambers are shown and are numbered, respectively, 7 and 8, although it is evident that one chamber alone would be sufficient, or, if desired, three or more chambers might be used in series by merely duplicating those shown. The chambers 7 and 8 will preferably be circular in outline, as shown, although this is not absolutely necessary, and will also preferably be provided with rounded or dome-shaped tops. The lower ends of these chambers project down into a large reservoir 10, in which water will be maintained at substantially a constant level, as shown in Fig. 2, and the lower ends of the chambers 7 and 8 are open, but project down into the water sufficiently far to form an effectual seal.

Projecting downwardly into the inlet-chamber 7 is a pipe 12, which is connected to or is a continuation of the pipe 4, coming from the dust-catcher, this being the inlet-pipe for the gas. This pipe projects down into the chamber 7 into fairly close proximity to the surface of the water, which seals the lower end of said chamber, in actual practice being held from eight to twelve inches above the surface of said water. In this pipe are located a series of plates 13, extending radially from the center to the perimeter thereof, as shown in Fig. 3, ten such plates being shown. These plates do not extend straight down, but are arranged on a spiral, so as to give a whirling motion to the gas, beat it against the baffle-plates 13, and discharge the dust with a whirling motion against the surface of the water in the lower portion of the chamber 7. In this way the dust is knocked out of the gas and slides down the plates into the water, becomes moistened, and cannot rise again and flow along with the gas. The spiral plates 13 extend some distance below the lower end of the pipe 12, and most of the gas will escape out through the open sides formed by these plates, while other portions will pass down underneath the lower edges of the plates, the effect of these plates being to direct the dust into closer proximity to the surface of the water than would otherwise be the case.

Arranged between the inlet-pipe 12 and the outer walls of the chamber 7 is a partition-wall 15, which extends entirely around the inlet-pipe, so as to leave an annular space 16 between the same and the inlet-pipe and a similar space 17 between the same and the outer walls of the chamber. The lower end of this partition-wall extends down into the water in the tank 10, so that a water seal is formed, and the upper end of said partition-wall projects fairly close to the top of the chamber. The gas after escaping from the lower end of the inlet-pipe 12 flows upwardly in the space 16 between the inlet-pipe and the partition-wall 15 and then downwardly through the space 17 between said partition-wall and the outer wall of the chamber.

In the outer space 17 are arranged a series of plates 19, extending radially across the same, which also are arranged on a spiral, so as to give the gas a spiral trend as it passes downwardly through this space, and causes the gas to again strike said plates to beat out any dust which may still remain in the same and direct said dust down to the water. The lower ends of these spiral plates terminate some distance above the surface of the water, so that the gases will have a free opening underneath said plates to the outlet 20 in the side of the chamber 7 toward the chamber 8.

The chamber 8 is substantially the same in construction as the chamber 7, having the central outlet-pipe $12^a$ and the partition-wall $15^a$, both arranged in substantially the same manner as the pipes 13 and partition-wall 15 in chamber 7. The partition-wall in this case forms an outer space $17^a$ between the same and the outer wall of the chamber and another space $16^a$ between said partition-wall and the outlet-pipe $12^a$. The inlet into this chamber is through an opening 21 on the side toward the chamber 7 and near the bottom thereof, so that the gas flows upwardly through the space $17^a$, downwardly through the space $16^a$, and upwardly through the central outlet-pipe $21^a$ to the point of use. Spiral plates 23 are arranged in the space $16^a$ and terminate above the surface of the water, so that a further spiral or whirling movement will be given to the gas, and any dust still remaining in the same will be beaten out and slide down the plates and be deposited in the water. The lower end of the outlet-pipe $12^a$ is arranged substantially the same height above the water as the lower end of the inlet-pipe 12.

The openings 20 and 21 in the two chambers are connected by a suitable passage-way, which is formed by means of a hood-plate 25, bridging the space between the two chambers and extending from side to side of the tank 10, this hood-plate having the general form shown in Fig. 3 and being arched from side to side, as shown in Fig. 4. As a consequence the passage between the two chambers will be practically the full width of the tank 10, which is equal to the diameter of the chambers 7 and 8, thus giving a very wide passage from one chamber to the other.

In case the furnace should have a slip or for other cause the gas be extremely dirty it may be necessary to spray the same with water. This I accomplish by placing a pair of perforated spray-pipes 27 in the passage-way between the two chambers, said pipes extending transversely of the tank 10 and being provided with a suitable controlling-valve 28 for admitting water thereto. These pipes will send sprays of water downwardly and through which the gas must flow, thus washing out the impurities contained therein. When this is done, it is necessary to dry the gas, and for this purpose the outlet-pipe $12^a$ is provided with a number of drying or baffle plates 30, ten such plates being shown extending radially from the center of said pipe out to the outer edges thereof. Preferably these plates will be arranged on a spiral, so as to more efficiently take the moisture out of the gas.

When the furnace is working normally, the spray-pipes 27 will not be put into use, the remainder of the apparatus being sufficient to take out all of the dust in the gas. It is preferred not to spray the gas with water unless absolutely necessary, as thereby the temperature will be somewhat reduced and it is desirable to maintain the temperature as high as possible. Consequently the water will be turned onto the spray-pipes only in case the furnace is not working normally, so that a very large amount of dust goes over with the gas.

Inasmuch as the gas flowing through the cleaner will be at a very high temperature it is necessary to protect the cleaner against the heat. To do this, the chambers and pipes are lined as far as possible with brick or other heat-resisting material.

As shown in the drawings, the chambers 7 and 8 are provided near their bottoms with inwardly-projecting flanged bars 32 for supporting the brickwork 33, which lines the chambers. These flanged bars on the outer sides will be angle-bars, while on the inner sides—that is, the sides of the two chambers which face each other—will be Z-bars, as shown at 36, one flange of which serves to support the brickwork 34, while the other flanges support the hood-seat 25. The latter also will be lined on its bottom face with brickwork 37. The Z-bars 36 are practically of semicircular form, as indicated in plan, Fig. 3. The inlet and outlet pipes also will be lined with brickwork 38, resting on angle-bars 39, secured to the inner faces thereof above the spiral plates 13 and 30. In this manner the principal portions of the chambers are protected from the heat of the gas flowing through the same.

The reservoir 10 will be of general trough shape, as shown in Fig. 3, and will be provided with a series of openings 40 in its bottom, which are adapted to be closed by bell-valves 41, supported on levers 42, having thereon counterweights 43 for holding the valves closed. To open these valves, suitable connections are made to levers 44, mounted in any convenient position. By operating the levers 44 the valves 41 can be opened, thus enabling the tank to be flushed out. The trough shape of the tank permits the dirt and other impurities to be washed down into the bottom thereof, so that it will readily flow out through the cleaning-openings when the valves are opened.

The reservoir 10 will be supplied with water from any suitable source, and the waste water coming from the furnace, and which is used for cooling parts thereof, is well adapted for this purpose. This will enter the reservoir at any suitable place, such as through the opening 46. The reservoir is provided with an overflow-opening 47, and the level of the water in said reservoir is maintained by means of a gate 48. This gate is vertically adjustable in suitable guideways 49, so that the height thereof may be varied in order to vary the level of the water in the reservoir. Any suitable means may be used for vertically adjusting this gate, that shown in the drawings comprising chains 50, connected to the gate and passing over guide-sheaves 51 and thence to a counterbalancing-weight 52. Any other suitable means will answer this purpose. By means of the gate the height of the water in the reservoir can be changed, if desired, so as to bring the same into closer or remoter proximity to the lower ends of the pipes 12 and 13. Usually, however, the water will be maintained at a constant level.

Inasmuch as the chambers 7 and 8 are water-sealed they form closed pockets in which there is no circulation of water. As a consequence the dust and other impurities collect on top of the water and soon form a coating or scum thereon. This will prevent the dust which is thrown down from the gas from being moistened, and it is therefore desirable to keep the surface of the water clean. This I accomplish by providing an outflow from the surface of the water in each of the sealed chambers. This result can be accomplished in various ways; but, as shown in the drawings, I arrange a vertical pipe 53 centrally in each sealed chamber, these pipes being provided at their upper ends with funnels or flaring mouths 54, which will be maintained a short distance below the surface of the water—say an inch or two—so that the surface-water will flow down through the pipes, thus creating a current in the chambers at the surface of the water and keeping said surface clear of impurities. The pipes 53 project down through the bottom of the reservoir 10 and are provided with suitable valves for regulating the flow of water through the same, the purpose being to have the flow so slow that it will not lower the level of the water in the reservoir, and thus destroy the water seal. Any suitable regulating-valves will be employed for this purpose; but I prefer to use valves which are self-cleaning. To this end the lower ends of the pipes are left perfectly straight and are closed by means of bell or cone valves 55, mounted on the ends of operating-screws 57, tapped through yokes 58, secured to the lower ends of the pipes, so that thereby the position of the valves may be changed to vary the amount of opening at the lower ends of the drain-pipes. A similar flushing-pipe is placed underneath the space between the two chambers, so as to keep the surface of the water in this space clear of impurities.

The lower ends of the pipes 53 are provided with threads 59, which may be formed directly on the pipes or on castings 60, to which the pipes are secured. These threaded portions work in threaded sleeves or bushings 61, secured in the bottom of the reservoir 10. By means of this adjustment the top of the pipes 53 may be set at different heights, so as to accommodate them to various heights of water in the reservoir due to the adjustment of the gate 48. When slips occur in the furnace, considerable coke is liable to pass over with the gas. To prevent this from clogging the pipe 53 in the first chamber, said pipe is protected by a hood 62ª, as shown in Fig. 6.

Underneath the reservoir will be a suitable gutter 62 for gathering and conveying away the overflow from the opening 47, the overflow from the pipes 53, and the water coming from the cleaning-openings 40.

The mechanical construction of the apparatus described may be varied within wide limits. In the drawings the reservoir 10 is shown as built up of metal plates having a strengthening-angle 63 at their upper edges. This reservoir is provided with outwardly-projecting brackets 64, which may be placed upon suitable masonry or columns 65 for supporting the apparatus. The chambers 7 and 8 are supported on the reservoir from transverse beams 65ª, extending across the reservoir and suitably secured to the walls thereof. The outer shell of the chambers 7 and 8 and the partition-walls 15 and 15ª of the two chambers rest upon these beams, being supported directly thereby on their inner sides and being secured thereto by any suitable means, such as angle-brackets, so that they cannot rise in case of an excess pressure of gas in the chambers. On their outer sides the chambers 7 and 8 have their walls extended downwardly to the bottom of the reservoir. The partitions 15 and 15ª are supported on their outer sides by brackets 69, secured to the outer walls of the chambers. The central pipes 12 and 12ª are supported in part by the dome tops of the chambers and in part by angle-brackets 68, secured to the partition-walls 15 and 15ª and to said central pipes. In this manner an exceedingly simple structure is provided, one that can be cheaply built and which is strong and durable. All of the surfaces inside are practically smooth, so that no place is provided for the lodgment of dirt.

While in the drawings the chambers 7 and 8, the partition-walls 15 and 15ª, and the central pipes 12 and 12ª are shown as circular in cross-section, this is not essential, as they may be of any other desired cross-section. For simplicity of construction, however, the circular form is preferred; but I wish it understood that my invention is not limited in this particular. The mechanical features of the device may of course be varied within wide limits.

In the use of my apparatus the gas coming from the dust-catcher 3 passes down through the pipe 12, up through the annular space 16 between said pipe and the partition-wall 15, down through the annular space 17 between said annular partition and the outer walls of the chamber 7, and is collected in the annular space at the lower end of the spiral plates 19 in the spaces 17. Thence it passes out through the side opening 20, underneath the hood-plate 25, and up through the space 17ª in the chamber 8, down through the space 16ª in said chamber, and up through the outlet-pipe 12ª to the point of use. In its course through this cleaner it will be directed three separate times downwardly against the surface of the spiral plates—viz., in the inlet-pipe 12, again in its downward passage through the space 17 in the chamber 7, and again in its downward passage through the space 16ª in the chamber 8. As a result, said gas is brought three different times into contact with the baffle-plates, and the dust will be beaten out and slide down the plates and into water, where it will be moistened and held by the water. The spiral plates 13, 19, and 23 give to the gas a whirling or twisting movement in its downward passage, so that the dust will be thoroughly beaten out of the gas and will strike the surface of the water, thus insuring all the dust being moistened and held in the water. The heavy dirt will sink down into the bottom of the trough-shaped reservoir 10, from which it can be readily removed by opening the cleaning-valves 41. The lighter dirt will float on the surface of the water, from which it will be removed by the current created by the overflow-pipes 53, so that the surface of the water will always be clean to insure the wetting of all dust coming into contact therewith.

Under normal conditions of the furnace only a part of the gas comes into contact with the surface of the water and is not materially moistened nor cooled. As a consequence its calorific properties remain very high. Any moisture that it may absorb will be removed by the baffle-plates 30 in the outlet-pipe. Should, however, the furnace not be working normally, such as in case of slips, a large amount of dust will go over with the gases. In this case the valves 28 will be opened to admit water to the spray-pipes 27, thus spraying the gas and removing from it the excess of dust. In this case the gas will absorb considerable moisture, which will be removed by the baffle-plates 30.

While my gas-cleaner has been described especially in connection with blast-furnaces and its principal use will be for this purpose, many features thereof are adapted for cleaning any kind of gas, no matter how manufactured or for what purpose it is used. I wish, therefore, it understood that my invention is not limited to use with blast-furnaces.

What I claim is—

1. A gas-cleaner comprising a chamber containing water, a gas-inlet thereto, a gas-outlet therefrom, said chamber being arranged to separate the dust from the gas in a dry state and to discharge the dust against the surface of the water therein, a water-supply for said chamber, and an outlet-pipe projecting into said chamber and provided with a receiving-funnel located at the surface of the water and arranged to cause a current from the surface of the water into said funnel.

2. A gas-cleaner comprising a plurality of closed chambers containing water, passages extending from each chamber to the next, a gas-inlet to the first chamber, a gas-outlet from the last chamber, said chambers being constructed and arranged to separate the dust from the gas in a dry state and to discharge the dust against the surface of the water in said chambers, a water-supply for said chambers, and a water-outlet from within each chamber having a receiving-funnel located at the surface of the water and arranged to cause a current from the surface of the water into said outlet.

3. A gas-cleaner comprising a plurality of chambers containing water, said chambers being constructed and arranged to separate the dust from the gas in a dry state and to discharge the dust against the surface of the water, passages extending from each chamber to the next, a gas-inlet to the first chamber, a gas-outlet from the last chamber, a water-supply from said chambers, an outlet-pipe projecting into each chamber and provided with a receiving-funnel located at the surface of the water and arranged to cause a current from the surface of the water into said funnel, and a regulating-valve in each outlet-pipe.

4. A gas-cleaner comprising a chamber containing water constructed and arranged to separate the dust from the gas in a dry state and to discharge the dust against the surface of the water therein, a gas-inlet thereto, a gas-outlet therefrom, a water-supply for said chamber, an outlet-pipe projecting into said chamber and having a receiving-opening located at the surface of the water and arranged to produce a current from the surface of the water into said pipe, said pipe having a vertical discharge-opening, and a bell-valve for regulating said discharge-opening.

5. A gas-cleaner comprising a chamber containing water, a gas-outlet therefrom, and a gas-inlet thereto, said inlet extending into proximity to the surface of the water and being constructed and arranged to discharge the dust against the surface of the water with a gyrating or whirling movement.

6. A gas-cleaner comprising a chamber containing water, a gas-outlet therefrom, and a gas-inlet thereto, said gas-inlet being constructed and arranged to give a spiral or whirling motion to the gas to separate the dust from the gas while in a dry state and projecting downwardly with its lower end in proximity to the surface of the water thereby to direct the separated dust into the water.

7. A gas-cleaner comprising a chamber containing water, a gas-outlet therefrom, a gas-inlet thereto, said gas-inlet projecting downwardly and provided with spirally-arranged walls for imparting a spiral or whirling motion to the gas, said walls extending into proximity to the surface of the water to direct the separated dust thereinto.

8. A gas-cleaner comprising a chamber containing water, a gas-outlet therefrom, a gas-inlet thereto projecting downwardly into proximity to the surface of the water, and a series of spirally-arranged plates in said gas-inlet also extending downwardly into proximity to the surface of the water.

9. A gas-cleaner comprising a chamber containing water, a gas-outlet therefrom, a gas-inlet thereto projecting downwardly into proximity to the surface of the water, and spirally-arranged plates in said inlet extending below the lower end of said inlet-pipe.

10. A gas-cleaner comprising a chamber containing water, an inlet-pipe projecting down in said chamber and terminating above the surface of the water therein, an outlet from said chamber near the bottom thereof, and a partition located between the inlet-pipe and the outer wall of the chamber and having its lower end projecting into the water and its upper end extending into proximity to the top of the chamber, whereby the course of the gas is downwardly in the inlet-pipe, upwardly in the space between said pipe and the partition, and downwardly in the space between the partition and the outer wall of the chamber.

11. A gas-cleaner comprising a chamber containing water, an inlet-pipe projecting down in said chamber and terminating above the surface of the water therein, an outlet from said chamber near its bottom, a partition located between the inlet-pipe and outer wall of the chamber and having its lower end projecting into the water and its upper end extending into proximity to the top of the chamber, and spiral plates arranged radially in the space between the partition-wall and outer walls of the chamber and terminating above the surface of the water.

12. A gas-cleaner comprising a chamber containing water, an inlet-pipe projecting down in said chamber and terminating above the surface of the water therein, a gas-outlet from said chamber near the bottom thereof, a partition located between the inlet-pipe and outer walls of the chamber and having its lower end projecting into the water and its upper end extending into proximity to the top of the chamber, and spirally-arranged plates in the inlet-pipe and in the space between the partition and the outer walls of the chamber, the last-named plates terminating above the surface of the water.

13. A gas-cleaner comprising a plurality of chambers containing water, a passage connecting said chambers near their bottoms, an inlet-pipe to the first chamber, an outlet-pipe from the last chamber, said inlet and outlet pipes projecting down into the chambers and terminating above the surface of the water therein, and partitions in each chamber located between the inlet and outlet pipes, respectively and the outer walls of said chambers with their lower ends projecting into the water and their upper ends extending into proximity to the tops of the chambers.

14. A gas-cleaner comprising a plurality of chambers containing water, a passage connecting said chambers near their bottoms, a gas-inlet pipe into the first chamber, an outlet-pipe from the last chamber, said inlet and outlet pipes projecting down in said chambers and terminating above the surface of the water therein, partitions in each chamber located between the inlet and outlet pipes, respectively and the outer walls thereof with their lower ends projecting into the water and their upper ends extending into proximity to the tops of the chambers, and spirally-arranged plates in one or more of the spaces in said chambers wherein the gas has a downward flow.

15. A gas-cleaner comprising a plurality of chambers containing water, a gas-inlet into the first chamber, a gas-outlet from the last chamber, said chambers being constructed and arranged to separate the dust from the gas in a dry state and to discharge the dust against the surface of the water therein, an outlet from each of said chambers having an opening so located as to cause a current from the surface of the water into said outlet, a passage connecting said chambers, spraying means located in said passage, and gas-drying means in the outlet-chamber.

16. A gas-cleaner comprising a plurality of chambers containing water, a gas-inlet pipe into the first chamber, a gas-outlet pipe from the last chamber, said inlet and outlet pipes projecting down in said chambers into proximity to the surface of the water therein, partitions in each chamber located between the inlet and outlet pipes respectively and the outer walls thereof with their lower ends projecting into the water and their upper ends extending into proximity to the tops of the chambers, a passage-way connecting the chambers near their bottoms, and spray-pipes located in said passage-way.

17. A gas-cleaner comprising a plurality of chambers containing water, a gas-inlet pipe into the first chamber, a gas-outlet pipe from the last chamber, said inlet and outlet pipes projecting down in said chambers and terminating above the surface of the water therein, partitions in each chamber located between the inlet and outlet pipes, respectively and the outer walls thereof with their lower ends projecting into the water and their upper ends extending into proximity to the tops of the chambers, a passage-way connecting the chambers near their bottoms, spray-pipes located in said passage-way, and baffle-plates located in the outlet-pipe.

18. A gas-cleaner comprising a plurality of chambers containing water, an inlet-pipe into the first chamber, an outlet-pipe from the last chamber, said inlet and outlet pipes projecting down into said chambers and terminating above the surface of the water therein, partitions in each chamber located between the inlet and outlet pipes, respectively and the outer walls with their lower ends projecting into the water and their upper ends extending into proximity to the tops of the chambers, spirally-arranged plates in the spaces in said chambers through which the gas flows downwardly, a passage-way connecting the chambers near their lower ends, spray-pipes located in the path of the gas through said chambers, and baffle-plates in the outlet-pipe.

19. A gas-cleaner comprising a tank having a trough-shaped bottom, cleaning-openings in said bottom provided with controlling-valves, means for maintaining the level of water in said tank, a chamber having an open lower end projecting below the surface of the water, a gas-inlet arranged to separate the dust from the gas in a dry state and to discharge the dust against the surface of the water, a water-supply for said tank, and an outlet-pipe projecting into said chamber and having a large receiving-opening located at the surface of the water and arranged to cause a current from the surface of the water into said outlet-pipe.

20. A gas-cleaner comprising a chamber containing water, a gas-inlet thereto, a gas-outlet therefrom, said chamber being arranged to separate the dust from the gas in a dry state and to discharge the dust against the surface of the water forming the seal, a water-supply for said chamber, an outlet-pipe projecting upwardly into said chamber and having a large opening located at the surface of the water and arranged to cause a current from the surface of the water into said pipe, and means permitting said pipe to be adjusted vertically.

In testimony whereof I, the said PATRICK MEEHAN, have hereunto set my hand.

PATRICK MEEHAN.

Witnesses:
LEO MEEHAN,
ROBERT C. TOTTEN.